UNITED STATES PATENT OFFICE.

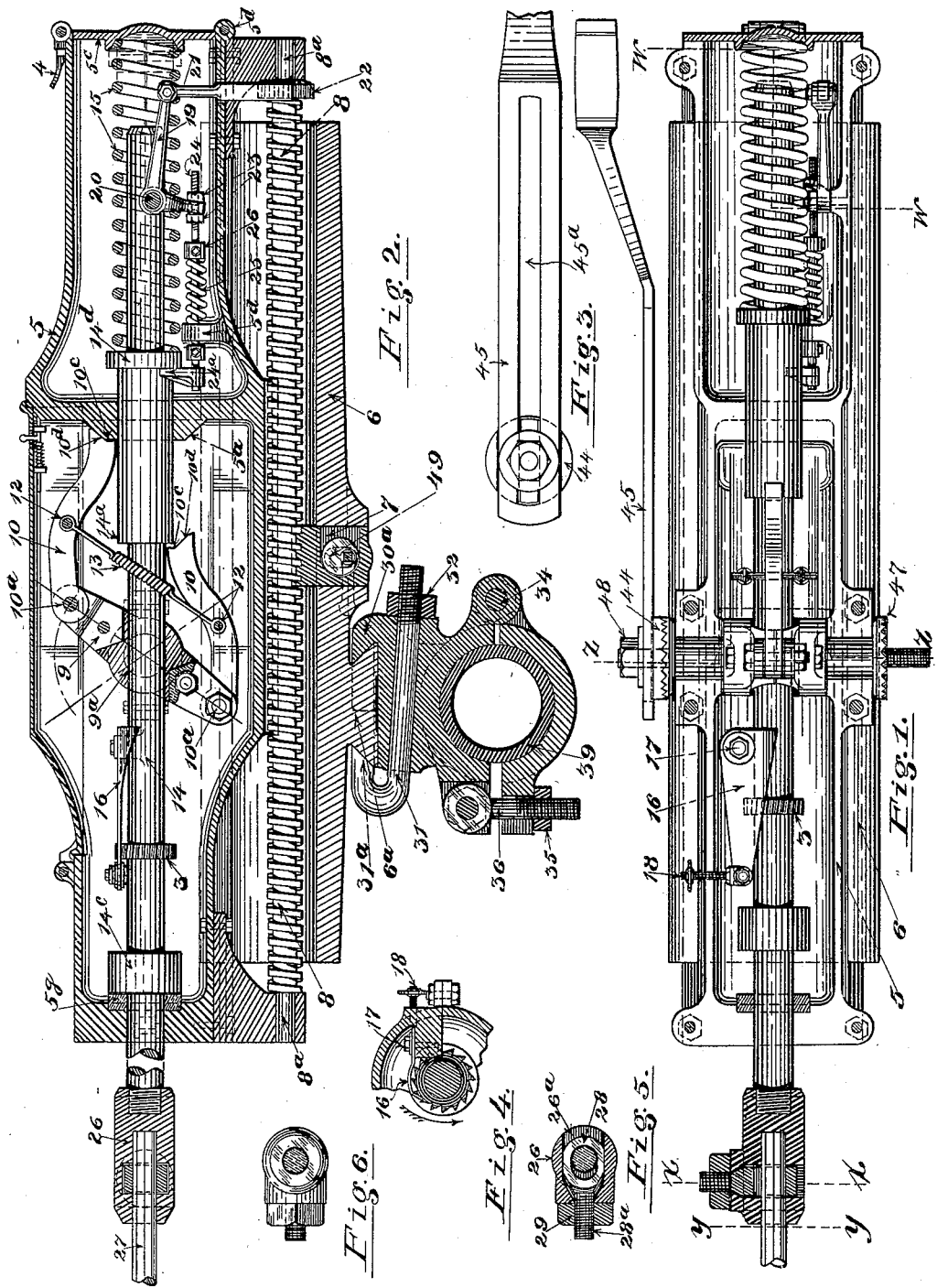

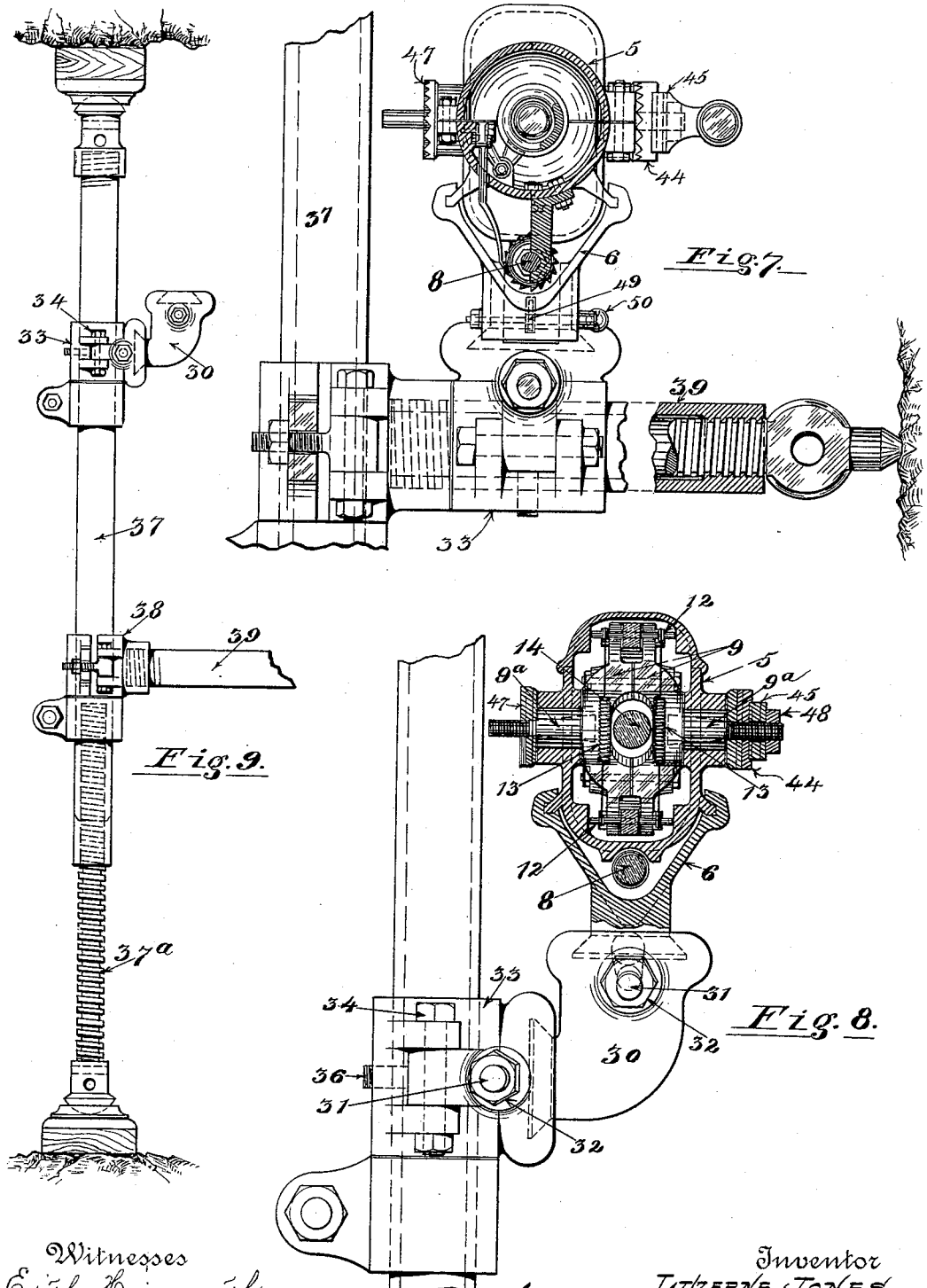

LUZERNE JONES, OF DENVER, COLORADO.

HAND ROCK-DRILL.

SPECIFICATION forming part of Letters Patent No. 607,412, dated July 12, 1898.

Application filed April 12, 1897. Serial No. 631,825. (No model.)

*To all whom it may concern:*

Be it known that I, LUZERNE JONES, a citizen of the United States of America, residing at Denver, in the county of Arapahoe and State of Colorado, have invented certain new and useful Improvements in Hand Rock-Drills; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in hand rock-drills; and it consists of the features, arrangements, and combinations hereinafter described and claimed, all of which will be fully understood by reference to the accompanying drawings, in which is illustrated an embodiment thereof.

In the drawings, Figure 1 is a top or plan view of my improved drill, partly in section, the upper half of the casing being removed. Fig. 2 is a vertical longitudinal section taken through the center of the same. Fig. 3 is a fragmentary view of the operating-lever. Fig. 4 is a sectional detail illustrating the mechanism for rotating the drill-shaft. Fig. 5 is a section taken on the line $x\,x$, Fig. 1. Fig. 6 is a section taken on the line $y\,y$, Fig. 1. Fig. 7 is a section taken on the line $w\,w$, Fig. 2, looking toward the right, the mechanism for supporting the drill being shown in place and partly broken away. Fig. 8 is a section taken on the line $z\,z$, Fig. 1, the drill-supporting mechanism being shown in elevation. Fig. 9 shows the drill-supporting mechanism partly broken away.

Similar reference characters indicating corresponding parts in the views, let the numeral 5 designate the drill-casing slidingly mounted on a bed-plate 6, carrying a nut 7, engaged by the feed-screw 8, whose extremities are journaled in the casing 5, as shown at $8^a$. Located within the casing and trunnioned thereon, as shown at $9^a$, is a yoke 9, carrying dogs 10, which are respectively pivoted on the yoke extremities, as shown at $10^a$. These dogs are connected by coil-springs 13, whose extremities are attached to the pins 12, carried by the dogs. There are two springs 13, one being located on each side of the reciprocating shaft 14. The springs are adapted to hold the dogs in suitable operative relation with the shaft 14, which is provided with a shoulder $14^a$, alternately engaged by offsets $10^c$, formed on the dog extremities. Each dog extremity is also provided with an inclined beveled portion $10^d$, adapted to engage a beveled portion $5^a$ on the casing, whose function is to release the dog from engagement with the shaft 14 when the latter has reached its forward limit of movement and is ready for the forward or return stroke. The shaft 14 is driven forward by a power-spring 15, coiled around the shaft and engaging a shoulder thereon at one extremity. The opposite extremity of the spring bears against the rear end $5^c$ of the casing, which is hinged to the body thereof, as shown at $5^d$, and held in place by a latch 4. The yoke 9 is centrally apertured, as shown at $9^a$, to receive the shaft 14, which passes freely therethrough. The drill-shaft is further provided with a ratchet-collar 3, which is engaged by a triangular plate 16, mounted on the casing. The function of these elements 3 and 16 is to impart the necessary rotary movement to the drill-shaft as the latter is reciprocated. The plate 16 is pivoted at one corner, as shown at 17, while its opposite extremity is connected with an adjusting-screw 18, which protrudes from an opening in the casing. As the shaft 14 is moved backward the plate 16 gives it a partial rotation in the direction indicated by the arrow. (See Fig. 4.) The return or forward movement of the shaft is accomplished without rotation.

The feed mechanism will now be described. A bell-crank lever 19 is fulcrumed on the casing at 20. To one arm of this lever is connected a dog 21, which engages a ratchet-collar 22, attached to or formed on one extremity of the feed-screw 8. The opposite arm of the lever 19 is slotted to engage stop-nuts 23, screwed upon a rod 24, passing through a stationary guide-arm $5^d$, formed integral with the casing 5. Surrounding the rod 24 is a coil-spring 25, one extremity of which bears against the guide-arm $5^d$, while the other extremity is engaged by an adjustable tension-collar 26. The forward extremity of the rod 24 is provided with a projection 24ª, which lies in the path of the shoulder 14ᵈ on the drill-shaft as the latter is driven forward by the power-spring. As the shaft strikes the projection 24ª the rod 24 is moved forward and the bell-crank lever 19 actuated sufficiently to give the feed-screw a partial turn through the instrumentality of the dog 21 and the ratchet-collar 22.

The drill-shaft is also provided with a shoulder 14ᶜ, adapted to engage a cushion or buffer 5ᵍ, set into a recess formed in the forward extremity of the casing around the drill-shaft. The parts are so arranged that the feed mechanism will not be actuated until the shoulder 14ᶜ engages the buffer or until the shaft can move no farther without engaging the casing. When the parts are in this position, the collar actuates the feed mechanism and the casing is moved forward to allow the drill to pass farther into the rock. To the forward extremity of the shaft 14, which protrudes from the casing 5, is attached the chuck 26, carrying the drill 27. This chuck is slotted, as shown at 26ª, to receive a clamping-collar 28, having a threaded stem 28ª, which protrudes from the chuck on one side. To this threaded stem is applied a nut 29. The drill-bit is locked in place by tightening this nut.

Upon the bottom of the bed-plate is formed a dovetail collar 6ª, which engages a halfsocket 30ª, of counterpart shape, formed in an elbow 30. The bed-plate is locked on the elbow by means of a bolt 31, having a hooked head 31ª, which engages the dovetail collar and holds the latter securely in place. This bolt passes through an opening in the elbow below the socket and is held in place by a nut 32, applied to its protruding threaded extremity. The opposite extremity of the elbow 30 is provided with a dovetail collar, which engages a socket formed in one member of a clamp 33. This elbow is locked on the clamp by a bolt 31 of the same construction as that applied to the opposite extremity of the elbow. The clamp members are connected by a hinge-pin 34. Their extremities remote from the hinge-pin are connected by a bolt 36, pivoted on one member of the clamp and engaging a slot formed in the other member. To the free threaded extremity of this bolt is applied a nut 35, which is screwed down on the adjacent clamp member. The drill is attached to a vertical column 37 by means of the clamp 33. By loosening the clamp the drill may be moved up or down on the column at will. The extremities of the column, as shown in the drawings, engage the top and bottom, respectively, of a tunnel, in which the drill is located. The lower part of the column consists of a threaded shaft 37ª, which enters the hollow interiorly-threaded portion of the column, whereby the length of the latter may be regulated at will. To the column 37 is attached, by means of a suitable clamp 38, a laterally-projecting bar 39, adapted to engage the tunnel on one side. (See Fig. 7.) If desired, the drill-casing may be adjustably mounted upon this arm in such a manner that the drill may be moved horizontally on the lateral arm at pleasure by loosening the clamp. In this case by swinging the lateral arm to engagement with the opposite side of the tunnel a hole may be drilled to either side of the center of the breast at will. This lateral arm or bar 39 also forms a brace for the column and prevents the latter from turning during the operation of the drill.

The trunnion extremities of the yoke 9 are provided with clutch-collars 47, having serrated faces adapted to engage a collar 44, having a counterpart face. This last-named collar is slidingly attached to the operating lever-arm 45, which is slotted, as shown at 45ª, to receive the reduced threaded extremities of the trunnions, which project beyond the collars 47. The lever-arm is secured in place by means of a nut 48, applied to the threaded trunnion extremity and screwed down upon the lever. The collar 44 has a lug engaging the slot of the lever-arm. This lug is of such shape that it slides freely in the slot, but cannot turn therein. Hence when the nut 48 is screwed down tight the serrated faces of the collars 44 and 47 are locked together, so that the movement of the lever actuates the yoke.

The drill mechanism is operated by moving the lever-arm back and forth, whereby an oscillatory movement is imparted to the yoke. This movement of the yoke imparts the backward movement to the drill-shaft by forcing the dogs 10 alternately against the shoulder 14ª on the reciprocating shaft. As the dog moves backward its extremity engages the beveled portion 5ª of the casing and disengages the dog from the shaft, which compresses the power-spring as it moves backward. As soon as the dog releases the shaft the recoil of the spring drives the shaft forward, causing the drill-bit to strike the rock with a sudden and powerful blow. This operation is repeated as the hand-lever 45 is moved back and forth or in reverse directions. The length of the lever-arm from the yoke-trunnion to the hand-piece may be regulated by loosening the nut 48 and shifting the lever-arm on the trunnion extremity. The lever-arm may be applied to either trunnion of the yoke, as may be desired or as may be convenient or necessary. As the drill-shaft moves forward the shoulder 14ª thereon engages the projection 24ª on the rod 24 and actuates the latter sufficiently to give the feed-screw 8 a partial turn through the instrumentality of the bell-crank lever 19, the dog 21, and the ratchet-collar 22. This partial rotation of the feed-screw moves the casing forward toward the breast of the rock by virtue of the engagement of the feed-screw with the nut 7, which is suitably attached to the bed-plate. The nut occupies a recess in the bed-plate and is made to engage or disengage the feed-screw by means of an eccentric 49, controlled by a hand-crank 50. As the drill-shaft is making the backward stroke it is given a partial rotation through the agency of the triangular plate 16 and the ratchet-collar 3.

Having thus described my invention, what I claim is—

1. In a rock-drill, the combination with a suitable casing, the reciprocating shaft and the power-spring, of a rocking yoke centrally apertured to allow the shaft to pass therethrough and having central trunnions journaled in the casing, a dog pivotally mounted on each extremity of the yoke, the dogs being adapted to alternately engage a shoulder on the reciprocating shaft as the yoke is actuated, a spring connecting the two dogs, and suitable means for releasing the dogs when the shaft has reached its backward limit of movement.

2. In a rock-drill the combination with a suitable casing, a reciprocating shaft and a power-spring, of the rocking yoke having central trunnions engaging the casing, dogs attached to the respective yoke extremities and adapted to engage a shoulder on the reciprocating shaft, suitable means for connecting the dogs whereby they are held in operative relation with the reciprocating shaft, means for releasing the dogs when the shaft has reached its backward limit of movement, and means for imparting the rocking movement to the yoke.

In testimony whereof I affix my signature in presence of two witnesses.

LUZERNE JONES.

Witnesses:
 HENRY HOWARD, Jr.,
 ALFRED J. O'BRIEN.